US012612020B2

(12) United States Patent
Drewes

(10) Patent No.: US 12,612,020 B2
(45) Date of Patent: Apr. 28, 2026

(54) AXLE AND METHOD FOR COMPENSATING FOR A DELAY

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 772 days.

(21) Appl. No.: 18/000,450

(22) PCT Filed: May 27, 2021

(86) PCT No.: PCT/EP2021/064195
§ 371 (c)(1),
(2) Date: Dec. 1, 2022

(87) PCT Pub. No.: WO2021/244937
PCT Pub. Date: Dec. 9, 2021

(65) Prior Publication Data
US 2023/0211763 A1 Jul. 6, 2023

(30) Foreign Application Priority Data
Jun. 4, 2020 (DE) .................... 10 2020 114 872.0

(51) Int. Cl.
B60T 13/58 (2006.01)
B60T 1/10 (2006.01)
(Continued)

(52) U.S. Cl.
CPC .............. B60T 13/586 (2013.01); B60T 1/10 (2013.01); B60T 8/172 (2013.01); B60T 8/3215 (2013.01);
(Continued)

(58) Field of Classification Search
CPC .......... B60T 13/586; B60T 1/10; B60T 8/172; B60T 8/3215; B60T 2240/00;
(Continued)

(56) References Cited

U.S. PATENT DOCUMENTS

2011/0094807 A1* 4/2011 Pruitt ...................... B60L 50/40
180/65.6
2012/0130573 A1 5/2012 Wu et al.

FOREIGN PATENT DOCUMENTS

DE 102012217679 A1 4/2013
DE 102014205605 A1 10/2015
(Continued)

OTHER PUBLICATIONS

European Patent Office, International Search Report; Sep. 3, 2021, entire document.

*Primary Examiner* — Jason D Shanske
*Assistant Examiner* — Al-Birr Rahman Chowdhury
(74) *Attorney, Agent, or Firm* — Price Heneveld LLP

(57) ABSTRACT

An axle for utility vehicles includes a first wheel end and a second wheel end arranged opposite each other and rotatably on the axle, a recovery device connected to the first wheel end configured to recover rotational energy of the first wheel end, a braking device configured to decelerate the second wheel end, and a control unit configured to determine information on a deceleration of the first wheel end which results from the recovery and/or a deceleration of the second wheel end, and to control the braking device and/or the recovery device such that the deceleration of the first wheel end and the deceleration of the second wheel end are matched to each other, wherein the control unit is configured to determine the information on the deceleration of the first wheel end based on the recovered rotational energy.

20 Claims, 3 Drawing Sheets

DRIVING DIRECTION

(51) Int. Cl.
    *B60T 8/172*         (2006.01)
    *B60T 8/32*          (2006.01)
    *F16D 61/00*        (2006.01)
    *B62D 63/08*        (2006.01)

(52) U.S. Cl.
    CPC .......... *F16D 61/00* (2013.01); *B60T 2240/00*
          (2013.01); *B60T 2250/03* (2013.01); *B60T*
          *2270/604* (2013.01); *B62D 63/08* (2013.01)

(58) Field of Classification Search
    CPC .......... B60T 2250/03; B60T 2270/604; F16D
                        61/00; B62D 63/08
    See application file for complete search history.

(56)              References Cited

FOREIGN PATENT DOCUMENTS

| | | | |
|---|---|---|---|
| DE | 102015221996 | A1 | 5/2017 |
| DE | 202018106548 | U1 | 4/2020 |
| EP | 3321144 | A1 | 5/2018 |

\* cited by examiner

State of the Art

DRIVING DIRECTION

DRIVING DIRECTION

DRIVING DIRECTION

AXLE AND METHOD FOR COMPENSATING FOR A DELAY

BACKGROUND OF THE INVENTION

The present invention relates to an axle for a utility vehicle and particularly to a trailer, and to a method for compensating a deceleration of a first wheel end.

Axles are known in the prior art in which both wheel ends are connected to a recuperation device via an axle differential and a generator. When recuperating rotational energy from the wheel ends, deceleration of the same magnitude or a deceleration torque of the same magnitude are thus applied to both wheel ends. Energy can be recovered temporarily, for example during a braking process, or continuously by means of such a system. Because a deceleration of the same magnitude is applied to both wheel ends, it is ensured that the driving dynamics of such a vehicle remain stable when driving in a straight line. However, such a recuperation device attached on both sides is costly and requires a lot of structural space. Such a solution moreover has a high weight. If the recuperation device is connected to just one wheel end on one side, only a low-power generator can be used because otherwise problems with the driving dynamics can occur. Only a small amount of energy can thus be recovered.

The object of the present invention is therefore to provide an axle, a trailer or utility vehicle trailer, and a method for compensating a deceleration of a first wheel end due to the recuperation of energy, which can recover energy efficiently by means of a recuperation device, and can be implemented with low production costs and a low weight.

SUMMARY OF THE INVENTION

According to a first aspect of the present invention, an axle is provided in particular for utility vehicles, wherein the axle comprises a first wheel end and a second wheel end which are or can be arranged opposite each other and rotatably on the axle, a recuperation device (can also be referred to as a recovery device) which is or can be connected to the first wheel end and is designed to recuperate rotational energy of the first wheel end, a braking device which is designed to decelerate the second wheel end, and a control unit which is designed to determine information on a deceleration of the first wheel end which results from the recuperation, and/or a deceleration of the second wheel end, and to control the braking device and/or the recuperation device such that the deceleration of the first wheel end and the deceleration of the second wheel end are matched to each other. The axle can be a one-piece of a multi-part axle.

The axle can extend continuously or partially along an axis of rotation which corresponds to the axis of rotation of wheels provided on the axle. The first and the second wheel end can moreover rotate about the axis of rotation, in particular on the axle arranged non-rotatably on the utility vehicle or trailer. In the case of a multi-part axle (i.e. in the case of an axle which is composed of a plurality of separate individual parts), the axle can be formed in an operating state, for example, on a utility vehicle or a trailer. The wheel ends can be separate components which can be provided on the axle. The wheel ends can form an axial end of the axle. The wheel ends can be wheel hubs or elements on which in each case a rim can be arranged. During operation of a vehicle on which the axle according to the invention is provided, i.e. whilst driving, the first wheel end and the second wheel end can rotate together about the same axis of rotation. The recuperation device can be a regenerative brake which can be designed to convert kinetic energy into storable electrical energy and/or into a different form of energy. The recuperation device can here operate in a wear-free fashion in the manner of, for example, an electrodynamic brake. The recuperation device can comprise an electric machine which can operate as a generator during a recuperation process. The electric machine can be a synchronous motor or an asynchronous motor. A braking effect can be generated during the recuperation process by the electric machine being operated as an electrical generator. This braking effect can be applied to the wheel end connected to the recuperation device in the form of a deceleration. The recuperation device is preferably connected only to one wheel end of the two wheel ends provided on an axle. A saving can thus be made in structural space because it is possible to dispense with a differential and a connection between the recuperation device and the other wheel end of the axle. In contrast to a purely dynamic brake, the electrical energy recovered from the kinetic energy is not converted into heat in the recuperation device and instead is either stored in a battery provided in the vehicle or is fed directly to consumer units. The braking device can be any device which is designed to brake or decelerate the wheel end independently of the other wheel end provided on the same axle. The braking device can also be arranged on the first wheel end as long as the braking device can brake the second wheel end individually (i.e. independently of the first wheel end). The braking device can, for example, be part of a parking brake. In the present case, deceleration or braking can be understood as negative acceleration which causes the rotational speed of the respective wheel end to be reduced. The control unit can comprise a comparison unit which can receive information (for example, measurement data) and can output activation commands adapted thereto. The control unit can control other systems with the activation commands on the basis of the information obtained. For this purpose, the control unit can have a (wired or wireless) data link with the respective system. For example, a control unit already installed in the vehicle can be used as the control unit. The control unit can be designed such that it can control the recuperation device and/or the braking device such that decelerations, which are applied respectively to the first wheel end or the second wheel end either by the braking device or the recuperation device, are matched to each other. Matched to each other can mean that a torque resulting from the applied decelerations corresponds to a value and/or direction which is specified or set in advance. The resulting torque can occur when the first wheel end rotates more quickly than the second wheel end, or the other way round. The wheel end which rotates more quickly can thus cover a greater distance that the wheel end which rotates more slowly, as is the case for example when a vehicle on which the axle is installed takes a bend. The control unit can control the braking device and/or the recuperation device such that one of the wheel ends rotates more quickly than the other in order to cause the axle to change its driving direction, i.e. that it can be steered. The ability of a vehicle on which the axle is provided to take a bend can be assisted or facilitated by such a control system. Maneuvering of the vehicle can moreover be facilitated by such a control system. The selective deceleration of the first wheel end and/or the second wheel end can thus make taking a bend or maneuvering easier. Alternatively or additionally, the control unit can control the recuperation device and/or the braking device such that the decelerations of the first wheel end and the second wheel end are essentially of the same magnitude.

The decelerations of the first wheel end and the second wheel end can thus be compared with each other and it can be determined whether the difference between the two decelerations is or is not below a value determined in advance. It can thus be ensured that the driving dynamics of the vehicle on which the axle is installed remain stable during a deceleration process although the recuperation device is connected to only one wheel end. Deceleration on one side of the first wheel end, due to the recuperation of rotational energy of the first wheel end, can thus be essentially compensated by selective engagements of the braking device at the second wheel end such that the driving dynamics of the vehicle are not negatively influenced when driving in a straight line. The first wheel end and the second wheel end can thus be decelerated independently of each other. Moreover, with the present invention, an optimal balance between energy recuperation and production costs and the structural space used can be obtained such that the overall efficiency of the vehicle on which the axle is installed can be improved. The control unit can detect status values of the axle and/or the vehicle and, based on them, control the recuperation device and/or the braking device such that the detected values (i.e. the information) lie within a desired range (i.e. within a, for example, preset one). In an embodiment of the present invention, it is, for example, set that the resulting torque is as low as possible such that an optimal driving stability is ensured when driving in a straight line.

The information can preferably comprise the deceleration or deceleration values of the first wheel end and/or the second wheel end and/or a torque generated because of the decelerations. The torque generated can be a resultant torque which is generated in the axle because of a deceleration of at least one of the wheel ends. The information can be data which can be supplied by at least one detection apparatus of the control unit. The resultant torque can result from the deceleration of the first wheel end and the deceleration of the second wheel end. The information can be obtained by sensors provided specifically for the purpose such as, for example, a rotational speed sensor and/or an acceleration sensor or be acquired via a system provided in the vehicle. The control unit can, for example, obtain the information from an ESP system and/or ABS system.

The control unit can be designed to determine the information on the deceleration or deceleration values of the first wheel end based on the recuperated rotational energy. In addition, the speed can be determined from the recuperated rotational energy. Using the known speed and together with the time, the acceleration (i.e. the deceleration) can be determined. The control unit can thus be designed to determine the deceleration of the first wheel end based on the recuperated rotational energy. Accordingly, a sensor for measuring the recovered energy can be arranged at almost any location in a vehicle because it does not need to be arranged physically directly on the recuperation device. There can be an increased degree of freedom in the construction as a result. The sensor can moreover be provided at protected positions, as a result of which the reliability of the sensor can be ensured and its lifetime extended.

The control unit can have at least one sensor which is designed to determine the information. The sensor can, for example, be a rotational speed sensor which is designed to measure the rotational speed of a wheel end or both wheel ends. The speed can be determined by multiplying the rotational speed of a wheel end by the circumference of a running surface of a wheel mounted on the respective wheel end. From the speed (i.e. from the change in speed), the control unit can, together with time, determine the acceleration (for example, the deceleration). The control unit can thus determine the deceleration of the first wheel end and/or the second wheel end with the aid of a sensor which can measure, for example, the rotational speed of at least one wheel end. Two sensors can moreover be provided which are associated with the first wheel end and the second wheel end, respectively. Alternatively or additionally, a central sensor can also be arranged which can be an acceleration sensor and can be designed to measure the decelerations and/or a resultant torque directly.

Preferably, a first deceleration due to the deceleration of the first wheel end by the recuperation device can act at one end of the axle at which the first wheel end is or can be arranged, and a second deceleration due to the deceleration of the second wheel end by the braking device can act at another end of the axle at which the second wheel end is or can be arranged, and the control unit can moreover be designed to control the braking device and/or the recuperation device such that the first deceleration and the second deceleration are compensated or equalized or balanced out. The deceleration can be a deceleration torque which can act on the respective wheel end. The end of the axle can be an axial outer end of the axle. The first deceleration and the second deceleration are expediently compensated when they are essentially of the same magnitude. In the present case, essentially can mean that the second deceleration and the first deceleration are of the same magnitude if they correspond to a 5% deviation. It can thus be ensured that a deceleration applied on one side or a torque resulting therefrom can be compensated (i.e. equalized) by a selective activation of the braking device or the recuperation device.

The at least one sensor can preferably be designed to determine a yaw torque of the axle and/or a rotational speed of the first and/or the second wheel end. The sensor can here be a sensor already installed in the car and used for other purposes (for example, for an ESP system). The sensor can measure a yaw rate, for example with in particular silicon-based micromechanical yaw rate sensors. The sensor is preferably arranged at or in the center of gravity of the vehicle on which the axle is provided. Measuring the rotational speed can happen with an ABS sensor already installed in a vehicle. The rotational speed of each wheel end can thus be determined with the aid of a magnet wheel. Alternatively, separate and independent sensors can be provided for each of the abovementioned applications. The measurement values determined by the sensors can be made available to the control unit.

The braking device can preferably be a mechanical brake, in particular a disk brake or a drum brake. Braking devices can thus be used which are usually installed in vehicles, in particular in utility vehicles. It must simply be ensured that the braking device can be actuated individually by the control unit. In particular, the braking device can be actuated such that the deceleration of the first wheel end due to the recuperation of rotational energy and the deceleration of the second wheel end can be matched to each other. The braking device can thus be designed such that the second wheel end can be decelerated by means of the braking device individually and independently of the first wheel end.

The first wheel end can preferably be connected directly to the recuperation device, in particular with no differential situated between them. The recuperation device can have a gearbox and an electric machine. The electric machine can thus be connected to the first wheel end via the gearbox. In particular, the recuperation device can be connected to the first wheel end with an axle shaft. The fact that the recuperation device is attached to just one wheel end (i.e. that the recuperation device is attached on one side) has the advantage that a differential can be dispensed with, as a result of which less structural space around the axle is required. The axle system is thus more compact and less prone to damage. The weight of the axle is furthermore reduced.

According to a second aspect of the present invention, a trailer or utility vehicle trailer comprises at least one of the above axles. The trailer can comprise, for example, two of the above axles, wherein the two axles are arranged such that the first axle has the first wheel end on the left-hand side (in the driving direction) of the trailer, and the second axle has the first wheel end on the right-hand side (in the driving direction) of the trailer. The control system can thus be simplified and the control unit can control the recuperation device such that a deceleration at the first axle can be equalized by a deceleration at the second axle across all the axles, and the other way round. A deceleration of a wheel end due to recuperation at the first axle can thus be equalized by a deceleration of a wheel end due to recuperation at the second axle. Fewer braking engagements of the braking device are consequently required, as a result of which the efficiency when the trailer is being used can be increased.

According to a third aspect of the present invention, a method for compensating a deceleration of a first wheel end of an axle, in particular for a utility vehicle such as a utility vehicle trailer, due to recuperation is provided, wherein the method has the following steps: recuperating rotational energy of the first wheel end, determining information on the deceleration of at least the first wheel end, and compensating the deceleration of the first wheel end by decelerating a second wheel end of the axle based on the determined deceleration of the first wheel end. One-sided deceleration which occurs because a recuperation torque is applied to a wheel end can be compensated using the above method such that stable driving dynamics are ensured. The advantages and embodiments stated above in connection with the device apply analogously also for the method, and the other way round.

BRIEF DESCRIPTION OF THE DRAWINGS

Further advantages and properties will become apparent from the following description of preferred embodiments of the subject according to the invention with reference to the attached drawings. Individual features of the individual embodiments can here be combined with each other within the scope of the invention. In the drawings.

DETAILED DESCRIPTION OF THE PREFERRED EMBODIMENTS

Figure 1:
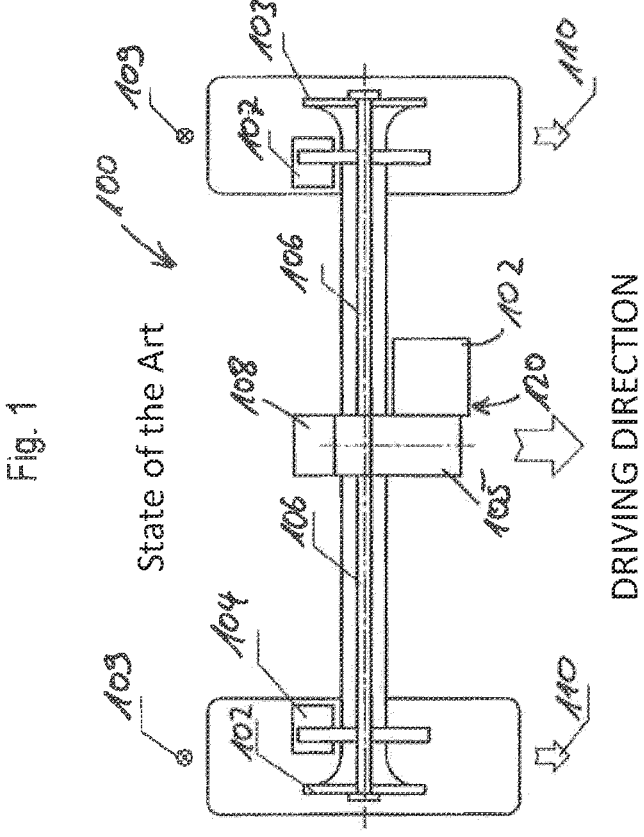
FIG. 1 is an axle from the prior art.

FIG. 1 shows schematically an axle 100 from the prior art. The axle 100 has a first wheel end 102 and a second wheel end 103. A braking device 104, 107 for decelerating the respective wheel end 102, 103 is arranged in each case at each wheel end 102, 103. The axle 100 moreover has a recuperation device (can also be referred to as a recovery device) 120 which is connected in each case to the first wheel end 102 and to the second wheel end 103 by means of an axle shaft 106 via a differential 108. The recuperation device 120 has a gearbox 105 and an electric machine 102. The driving direction is moreover indicated in FIG. 1 by an arrow. The arrows 110 illustrate the movement in the driving direction of the respective wheel end 102, 103. The same deceleration or the same deceleration torque 109 is applied to the two wheel ends 102, 103 during a recuperation process. Because of the presence of the differential 108 and two axle shafts 106, the axle illustrated in FIG. 1 needs a lot of structural space and is expensive.

Figure 2:
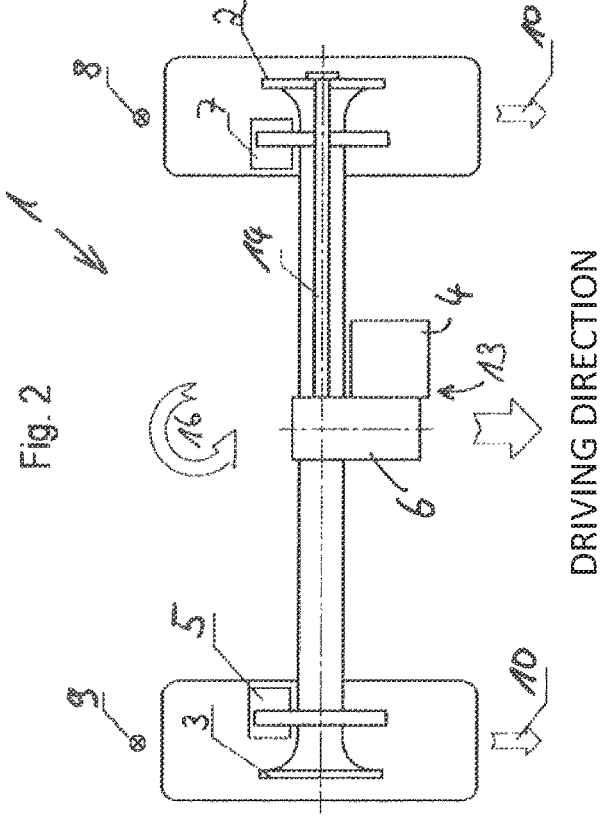
FIG. 2 is an axle according to an embodiment of the present invention.

FIG. 2 shows schematically an axle 1 according to an embodiment of the present invention. The axle 1 comprises a first wheel end 2 and a second wheel end 3. The first wheel end 2 and the second wheel end 3 each form an axial end of the axle 1. The first wheel end 2 and the second wheel end 3 are each part of a wheel hub which rotates, together with the axle 1, about an axis of rotation of the axle 1. A rim can be mounted on each of the wheel ends 2, 3. The axle 1 moreover has a recuperation device 13 which has a gearbox 6 and an electric machine 4. The recuperation device 13 is connected directly to the first wheel end 2 by means of an axle shaft 14. To be more precise, the recuperation device 13 is connected only (i.e. exclusively) to the first wheel end 2. The axle 1 moreover has braking devices 5, 7 which are associated with one of the wheel ends 2, 3, respectively, and can decelerate the respective wheel end 2, 3. The braking device 5 can decelerate the second wheel end 3 individually. In other words, the braking device 5 can cause a deceleration 9 at the second wheel end 3. On the other hand, the recuperation device 13 can generate a deceleration 8 at the first wheel end 2. A control unit which is not illustrated in FIG. 2 controls the recuperation device 13 and/or the braking device 5 such that the deceleration of the first wheel end 2 which results from the recuperation, and the deceleration of the second wheel end 3 which results from the deceleration by means of the braking device 5 are of essentially the same magnitude such that the movements 10 in the driving direction are of essentially the same magnitude. Stable driving dynamics of the axle 1 can thus be achieved when driving in a straight line. Put differently, a resultant torque 16 which rotates, for example, about the center point of the axle 1 is essentially zero. Where the deceleration 9 caused by the braking device and the deceleration 8 caused by the recuperation device are not of the same magnitude, the resultant torque 16 is also not zero and instead corresponds to an amount greater than zero. As a result, the driving dynamics of the vehicle 1 on which the axle 1 is provided can become unstable. In a further embodiment (not illustrated), the unstable driving dynamics can be used to improve driving when taking a bend and/or maneuvering a vehicle on which the axle 1 is installed. The control unit 11 (see FIG. 3) is here controlled in a selective fashion such that the movements 10 of the first wheel end 2 and the second wheel end 3 are not of the same magnitude. The resultant torque 16 is thus not zero. The axle 1 can thus be forced to take a curving path.

Figure 3:
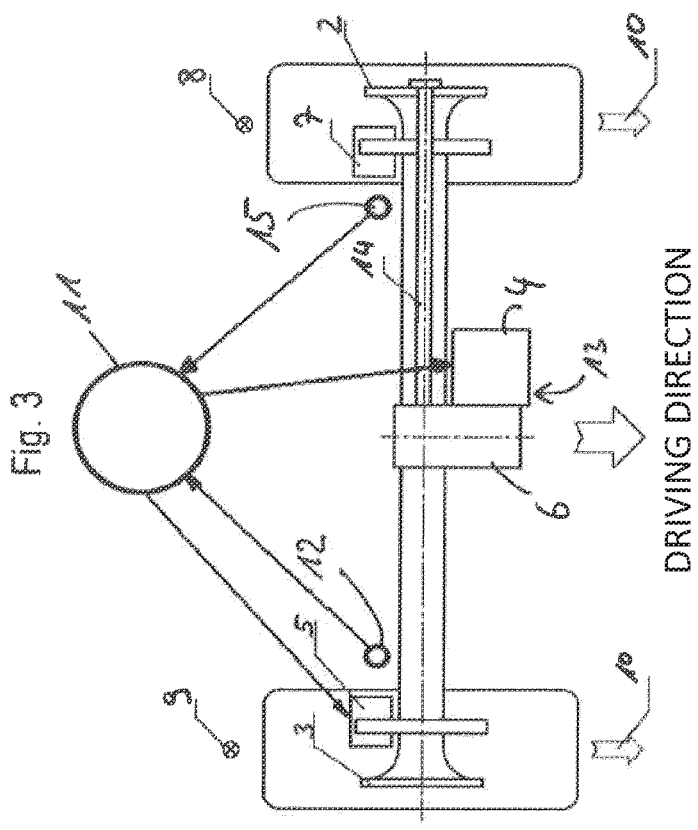
FIG. 3 is the axle according to the embodiment of the present invention.

FIG. 3 shows the axle 1 together with a schematic illustration of the information flows. The control unit 11 which obtains information or measurement values from sensors 12 and 15 is thus illustrated in FIG. 3. The control device 11 emits control commands to the braking device 5 and to the recuperation device 13. In the present embodiment, the first sensor 15 is associated with the first wheel end 2, and the second sensor 12 is associated with the second wheel end 3. The first sensor 15 determines, for example, the energy recovered by the recuperation device 13. In contrast, the second sensor 12 determines the rotational speed of the second wheel end 3. In a further embodiment (not illustrated), the first sensor 15 likewise determines the rotational speed of the first wheel end 2. In a further embodiment (not illustrated), only a single sensor is arranged which supplies the control device 11 with information, in particular with information on a yaw torque of the axle 1 or the vehicle in which the axle is provided. The control unit 11 is a compactor unit which assigns information that it receives to specified activation commands and outputs them. In particular, the control unit 11 outputs control commands to the braking device 5 and to the recuperation device 13. The control device 11 can thus ensure, by selective activation of the braking device 5, that the deceleration 9 due to a deceleration of the second wheel end 3 is essentially of the same magnitude as the deceleration 8 due to recuperation of rotational energy of the first wheel end 2. It can consequently be ensured that the movement 10 of both wheel ends 2, 3 is essentially of the same magnitude and hence the driving dynamics of the axle 1 is stable when driving in a straight line. In addition, selective control of the recuperation device 13 and/or the braking device 5 by the control unit 11 can cause the movement 5 in the driving direction of the first wheel end 2 and the second wheel end 3 to not be of the same magnitude, as a result of which the axle can be brought by the control system of the control unit 11 to move along a curving path. In other words, steering can be assisted by the control system.

LIST OF REFERENCE NUMERALS 1 axle
2 first wheel end
3 second wheel end
4 electric machine
5, 7 braking device
6 gearbox
8 deceleration by the recuperation device
9 deceleration by the braking device
10 movement in the driving direction
11 control unit
12 second sensor
13 recuperation device
14 axle shaft
15 first sensor
16 resultant torque

The invention claimed is:

1. An axle for utility vehicles, comprising:
a first wheel end and a second wheel end arranged opposite each other and rotatably on the axle;
a recovery device connected to the first wheel end and configured to recover rotational energy of the first wheel end;
a braking device configured to decelerate the second wheel end; and
a control unit configured to determine information on a deceleration of the first wheel end which results from the recovery and/or a deceleration of the second wheel end, and to control the braking device and/or the recovery device such that the deceleration of the first wheel end and the deceleration of the second wheel end are matched to each other;
wherein the control unit is configured to determine the information on the deceleration of the first wheel end based on the recovered rotational energy.

2. The axle as claimed in claim 1, wherein the information on the deceleration of the first wheel end and/or the second wheel end comprises a torque generated because of the decelerations.

3. The axle as claimed in claim 2, wherein the control unit has at least one sensor configured to determine the information.

4. The axle as claimed in claim 3, wherein the at least one sensor is configured to determine a yaw torque of the axle and/or a rotational speed of the first wheel end and/or the second wheel end.

5. The axle as claimed in claim 3, wherein a first deceleration due to the deceleration of the first wheel end by the recovery device acts at one end of the axle at which the first wheel end is arranged, wherein a second deceleration due to the deceleration of the second wheel end by the braking device acts at another end of the axle at which the second wheel end is arranged, and wherein the control unit is configured to control the braking device and/or the recovery device such that the first deceleration and the second deceleration are substantially of the same magnitude.

6. The axle as claimed in claim 5, wherein the braking device is configured to decelerate the second wheel end individually and independently of the first wheel end.

7. The axle as claimed in claim 6, wherein the recovery device is connected only to the first wheel end.

8. The axle as claimed in claim 7, wherein the control unit is configured to control the braking device and/or the recovery device such that one of the wheel ends rotates more quickly than the other.

9. The axle as claimed in claim 1, wherein the recovery device is connected to the first wheel end via a gearbox.

10. The axle as claimed in claim 1, wherein the first wheel end is connected directly to the recovery device with no differential situated therebetween.

11. The axle as claimed in claim 1, wherein the braking device is a disk brake or a drum brake.

12. The axle as claimed in claim 1, wherein the control unit has at least one sensor configured to determine the information.

13. The axle as claimed in claim 12, wherein the at least one sensor is configured to determine a yaw torque of the axle and/or a rotational speed of the first wheel end and/or the second wheel end.

14. The axle as claimed in claim 1, wherein a first deceleration due to the deceleration of the first wheel end by the recovery device acts at one end of the axle at which the first wheel end is arranged, wherein a second deceleration due to the deceleration of the second wheel end by the braking device acts at another end of the axle at which the second wheel end is arranged, and wherein the control unit is configured to control the braking device and/or the recovery device such that the first deceleration and the second deceleration are substantially of the same magnitude.

15. The axle as claimed in claim 1, wherein the braking device is configured to decelerate the second wheel end individually and independently of the first wheel end.

16. The axle as claimed in claim 1, wherein the recovery device is connected only to the first wheel end.

17. The axle as claimed in claim 1, wherein the control unit is configured to control the braking device and/or the recovery device such that one of the wheel ends rotates more quickly than the other.

18. A utility vehicle trailer comprising at least one axle as claimed in claim 1.

19. The utility vehicle trailer as claimed in claim 18, wherein the utility vehicle trailer comprises at least two of the axles, wherein the at least two axles are arranged on the utility vehicle trailer such that a first axle of the at least two axles has the first wheel end on the left-hand side of the utility vehicle trailer, and the second axle of the at least two axles has the first wheel end on the right-hand side of the utility vehicle trailer.

20. A method for compensating a deceleration of a first wheel end of an axle for a utility vehicle due to recovery, the method comprising:

recovering rotational energy of the first wheel end;

determining information on the deceleration of at least the first wheel end; and compensating the deceleration of the first wheel end by decelerating a second wheel end of the axle based on the determined deceleration of the first wheel end;

wherein the information on the deceleration of the first wheel end is determined based on the recovered rotational energy.

* * * * *